(12) United States Patent
Chang

(10) Patent No.: US 7,429,011 B1
(45) Date of Patent: Sep. 30, 2008

(54) FISHING REEL WITH IMPROVED TRANSMISSION EFFICIENCY

(75) Inventor: Liang-Jen Chang, Taichung County (TW)

(73) Assignee: Okuma Fishing Tackle Co., Ltd., Tanzih Township (TW)

( * ) Notice: Subject to any disclaimer, the term of this patent is extended or adjusted under 35 U.S.C. 154(b) by 0 days.

(21) Appl. No.: 11/845,472

(22) Filed: Aug. 27, 2007

(51) Int. Cl.
*A01K 89/02* (2006.01)

(52) U.S. Cl. .................... 242/260; 242/245; 242/257; 242/264; 242/303; 242/304

(58) Field of Classification Search ............... 242/245, 242/249, 257, 259, 260, 264, 302, 303, 304
See application file for complete search history.

(56) References Cited

U.S. PATENT DOCUMENTS

| | | | | |
|---|---|---|---|---|
| 5,297,756 A | * | 3/1994 | Ikuta | 242/270 |
| 5,318,246 A | * | 6/1994 | Ikuta | 242/303 |
| 6,045,073 A | * | 4/2000 | Ikuta | 242/260 |
| 6,164,576 A | * | 12/2000 | Takahashi | 242/271 |
| 6,286,773 B1 | * | 9/2001 | Ikuta | 242/260 |
| 6,805,313 B2 | * | 10/2004 | Nilsen | 242/303 |
| 7,234,661 B2 | * | 6/2007 | Hirayama et al. | 242/303 |

* cited by examiner

*Primary Examiner*—Emmanuel M Marcelo
(74) *Attorney, Agent, or Firm*—Browdy & Neimark

(57) ABSTRACT

A fishing reel with improved transmission efficiency is disclosed to include a shaft mounted in a casing, a spool sleeved onto the shaft, a brake pad mounted at one side of the spool, two disks mounted at two sides of the brake pad and rotatable by an external force, and a support set provided between the spool and the shaft. Thus, when the shaft is moved axially to a predetermined position, the shaft exerts a pressure to one disk and the spool via the support set, causing the brake pad to be clamped by the two disks. Therefore, the fishing reel is provided with excellent power transmission efficiency and strong spool braking force.

9 Claims, 6 Drawing Sheets

FISHING REEL WITH IMPROVED TRANSMISSION EFFICIENCY

BACKGROUND OF THE INVENTION

1. Field of the Invention

The present invention relates to a fishing reel and more specifically, to a fishing reel with improved transmission efficiency, which effectively transmits power and provides a high spool braking force.

2. Description of the Related Art

A conventional fishing reel uses a shaft to move a spool in axial direction such that a brake pad at one side of the spool is forced to stop against a metal disk. The metal disk is rotatable by a handle through a gear transmission mechanism. Therefore the power is transmitted from the handle to the spool. When the handle as well as the metal disk is fixed, the spool is provided with a braking force to prevent an excessive high speed of the let-off motion of the fishing line.

The aforesaid prior art design utilizes the friction force between the brake pad and the metal disk to transmit a rotary driving force from the handle to the spool, or to give a braking force to the spool. If the external force is excessively high, the brake pad and the metal disk may slip on each other, resulting in a power transmission loss and spool brake failure.

Therefore, it is desirable to provide a fishing reel that eliminates the aforesaid problem.

SUMMARY OF THE INVENTION

The present invention has been accomplished under the circumstances in view. It is therefore one object of the present invention to provide a fishing reel with improved transmission efficiency, which has low power transmission loss.

It is another object of the present invention to provide a fishing reel with improved transmission efficiency, which provides a high spool braking force.

To achieve these and other objects of the present invention, the fishing reel comprises a casing, a shaft, a spool, a brake pad, a gear rod, a bushing, a first disk, a second disk, a spring member and a support set.

The shaft is mounted in the casing and movable in an axial direction between a first position and a second position. The spool comprises an axle, an axial hole for receiving the shaft, a first flange radially extending from a first end of the axle, a second flange radially extending from a second end of the axle, a cover affixed to the first flange and defining with said first flange a chamber. The cover has an axial hole. The brake pad is mounted in the chamber of the spool in a manner that the brake pad is rotatable with the spool. The gear rod is rotatably sleeved onto the shaft. The bushing is fixedly sleeved onto one end of the gear rod and inserted into the axial hole of the cover such that the bushing rotates with the gear rod. The first disk is mounted in the chamber between the brake pad and the cover in a manner that the first disk is rotatable with the bushing. The second disk is mounted in the chamber between the brake pad and the first flange in a manner that the second disk is rotatable with the bushing. The spring member is connected between the first disk and the second disk. The support set is provided between the shaft and the spool. The shaft exerts a pressure to the second disk through the support set to force the second disk, the brake pad and the first disk abutted one another when the shaft locates at said second position.

DETAILED DESCRIPTION OF THE INVENTION

Figure 1:
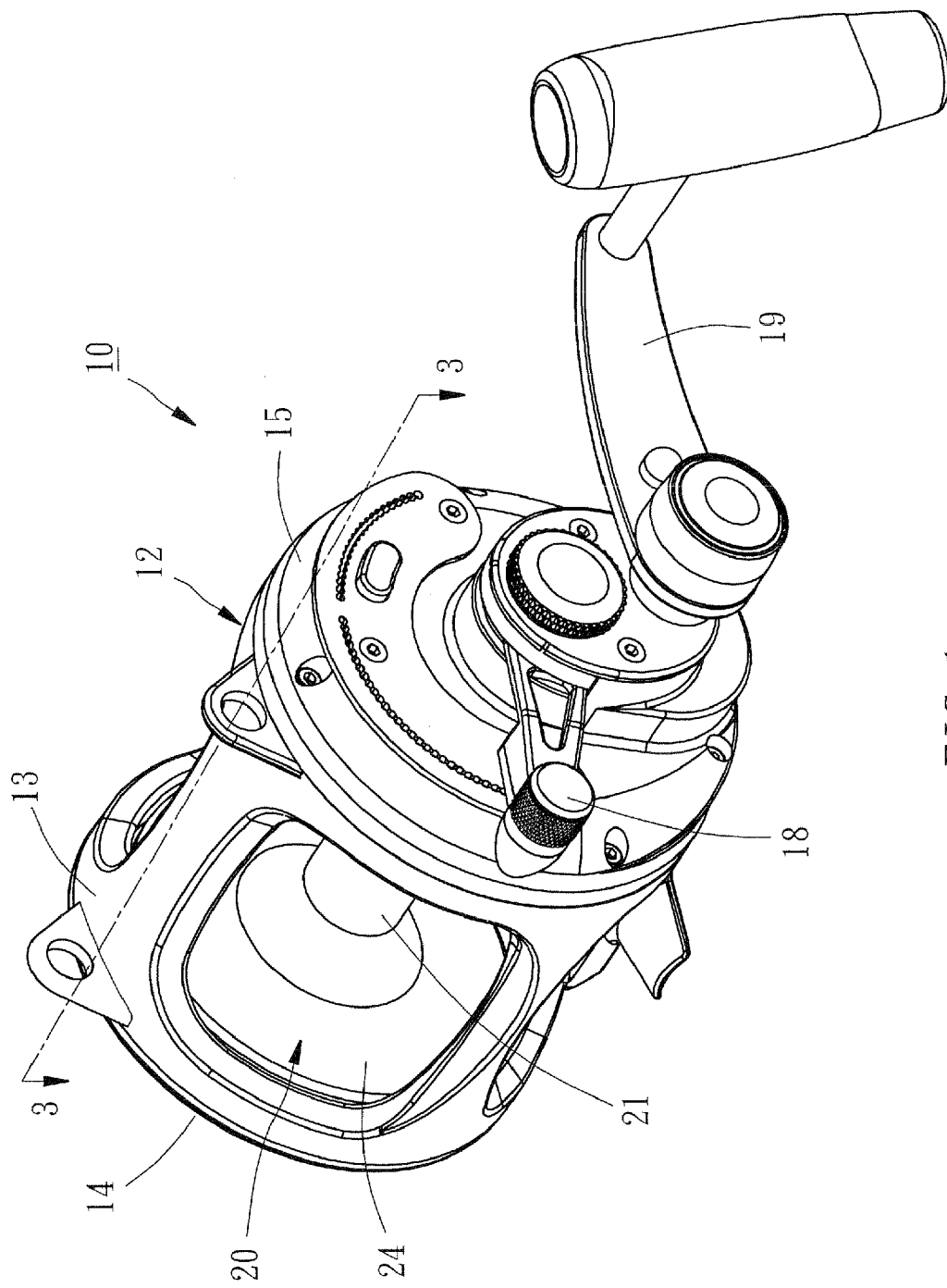
FIG. 1 is a perspective view of a fishing reel according to a first preferred embodiment of the present invention.
Figure 2:
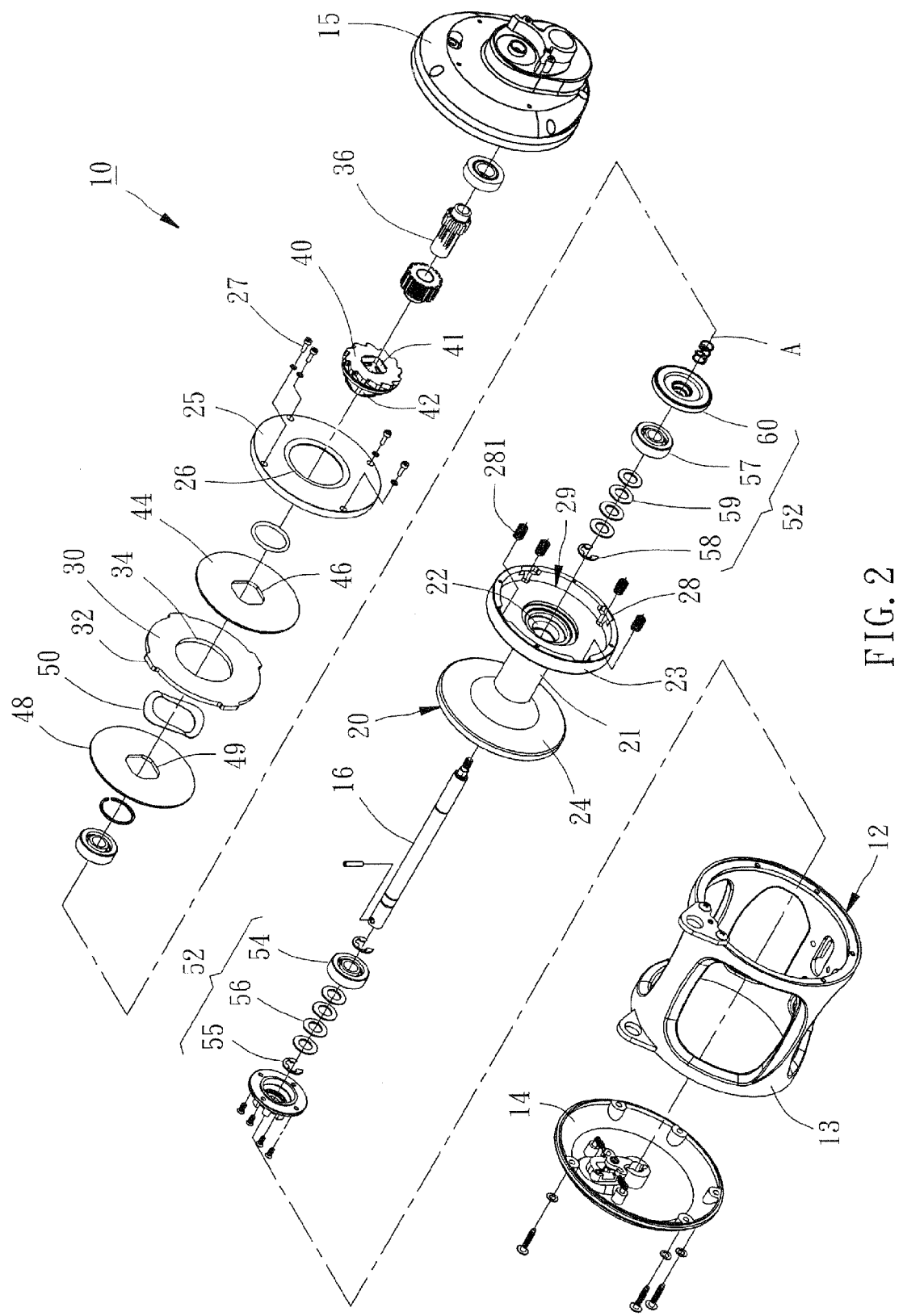
FIG. 2 is an exploded view of a part of the fishing reel according to the first preferred embodiment of the present invention.
Figure 3:
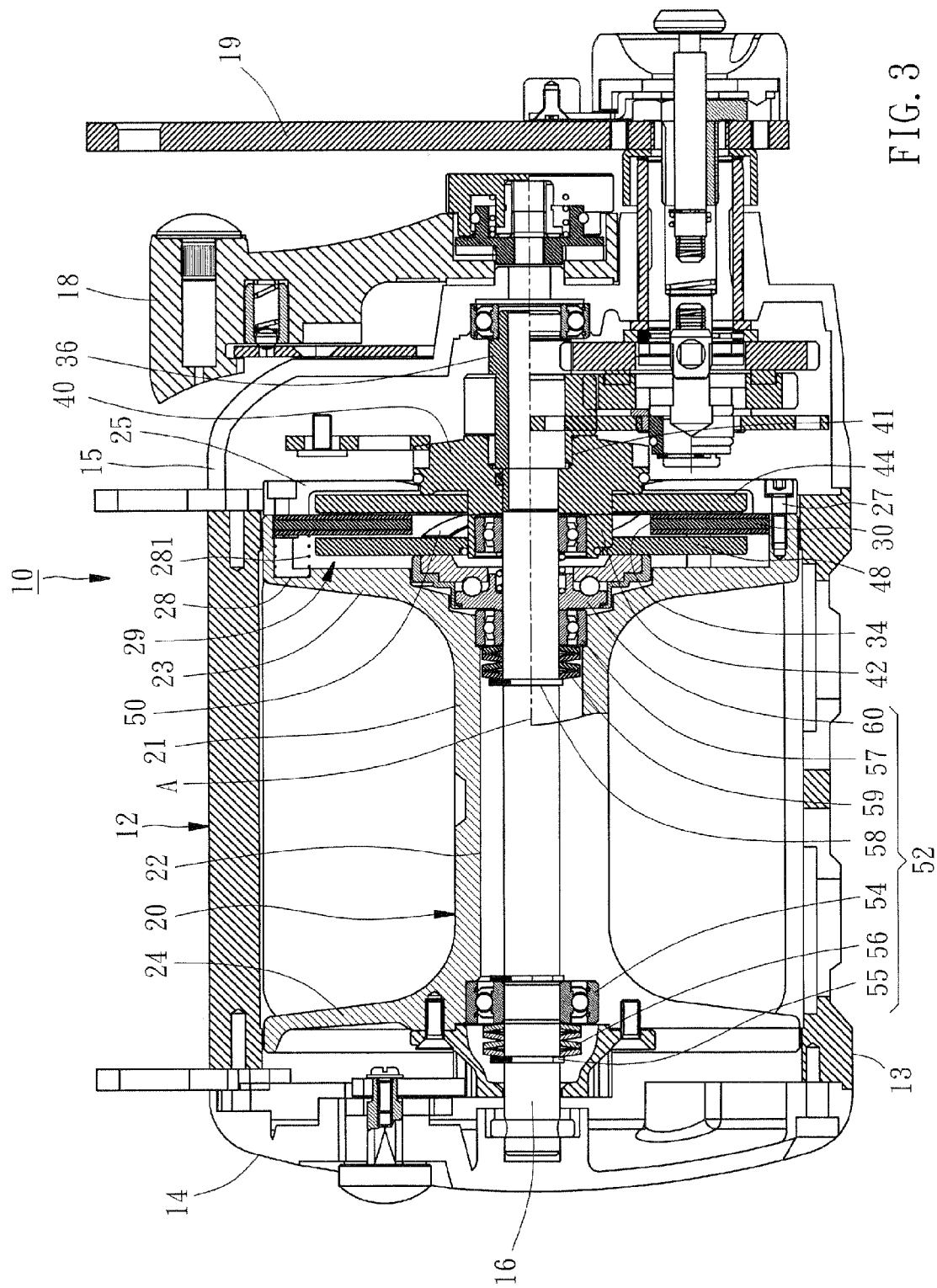
FIG. 3 is a sectional view taken along line 3-3 of FIG. 1.

Referring to FIGS. 1-3, a fishing reel 10 in accordance with the first preferred embodiment of the present invention is shown comprised of a casing 12, a shaft 16, a spool 20, a brake pad 30, a gear rod 36, a bushing 40, a first disk 44, a second disk 48, a spring member 50 and a support set 52.

The casing 12 is provided with a frame 13, a left cover 14 and a right cover 15. The shaft 16 is installed between the left cover 14 and the right cover 15. One end, namely, the right end of the shaft 16 is connected with a spanner 18. When turning the spanner 18, the shaft 16 is moved in an axial direction A between a first position (see FIG. 4) and a second position (see FIG. 6).

The spool 20 comprises a axle 21, an axial hole 22 extending through two distal ends of the axle 21 for receiving the shaft 16, a first flange 23 radially extending from the right end of the axle 21, a second flange 24 radially extending from the left end of the axle 21, and a cover 25 affixed to the first flange 23 with four bolts 27. The cover 25 has a circular center axial hole 26 in axial alignment with the axial hole 22 of the spool 20 for receiving the shaft 16. The first flange 23 has four recesses 28 for accommodating four springs 281. A chamber 29 is defined between the first flange 23 and the cover 25.

The brake pad 30 is mounted inside the chamber 29 of the spool 20 in a manner that the brake pad 30 is rotatable with the spool 20. Actually, the brake pad 30 has four protruding portions 32 respectively inserted into the four recesses 28 of the first flange 23 of the spool 20 so that the brake pad 30 is rotatable with the spool 20. The four springs 281 are provided between the first flange 23 of the spool 20 and the brake pad 30 such that the brake pad 30 is stopped against the cover 25 when the brake pad 30 receives no external force. The brake pad 30 has a center axial hole 34.

The gear rod 36 is rotatably sleeved onto the shaft 16. Further, a handle 19 is pivoted to the right cover 15 and coupled to the gear rod 36 through a transmission mechanism (not shown). Therefore, the gear rod 36 can be driven to rotate by the handle 19. Because the transmission mechanism is a known design, no further detailed description in this regard is necessary. Further, one end of the gear rod 36 has a rectangular cross section.

The bushing 40 is fixedly sleeved onto one end of the gear rod 36 such that the bushing 40 rotates with the gear rod 36. The bushing 40 has a rectangular axial hole 41 for receiving the rectangular end of the gear rod 36, therefore the bushing 40 is rotatable with the gear rod 36. The bushing 40 has an engagement portion 42 with rectangular cross section. Further, the bushing 40 is inserted in the axial hole 26 of the cover 25 and the axial hole 34 of the brake pad 30.

The first disk 44 is mounted in the chamber 29 of the spool 20 between the brake pad 30 and the cover 25 in a manner that the first disk 44 is rotatable with the bushing 40. Actually, the first disk 44 has a rectangular axial hole 46 for receiving the engagement portion 42 of the bushing 40 so that the first disk 44 is rotatable with the bushing 40.

The second disk 48 is mounted in the chamber 29 of the spool 20 between the brake pad 30 and the first flange 23 in a manner that the second disk 48 is rotatable with the bushing 40. Actually, the second disk 48 has a rectangular axial hole 49 for receiving the engagement portion 42 of the bushing 40 so that the second disk 48 is rotatable with the bushing 40.

The spring member 50 is disposed in the axial hole 34 of the brake pad 30 between the first disk 44 and the second disk 48. According to the present embodiment, the spring member 50 is a spring washer sleeved onto the engagement portion 42 of the bushing 40, imparting a spring force to keep the first disk 44 and the second disk 48 apart from the brake pad 30 when receiving no external force.

The support set 52 is provided between the shaft 16 and the spool 20. According to the present preferred embodiment, the support set 52 comprises a left bearing 54 sleeved onto the shaft 16 and positioned at the left side of the axle 21 of the spool 20, a retaining ring 55 clamped on the shaft 16, and four spring washers 56 sleeved onto the shaft 16 and stopped between the retaining ring 55 and the left bearing 54. The support set 52 further comprises a right bearing 57 sleeved onto the shaft 16 and positioned at the right end of the axle 21 of the spool 20, a retaining ring 58 clamped on the shaft 16, four spring washers 59 sleeved onto the shaft 16 and stopped between the retaining ring 58 and the right bearing 57, and a thrust bearing 60 sleeved onto the shaft 16 and positioned between the right bearing 57 and the second disk 48.

Figure 4:
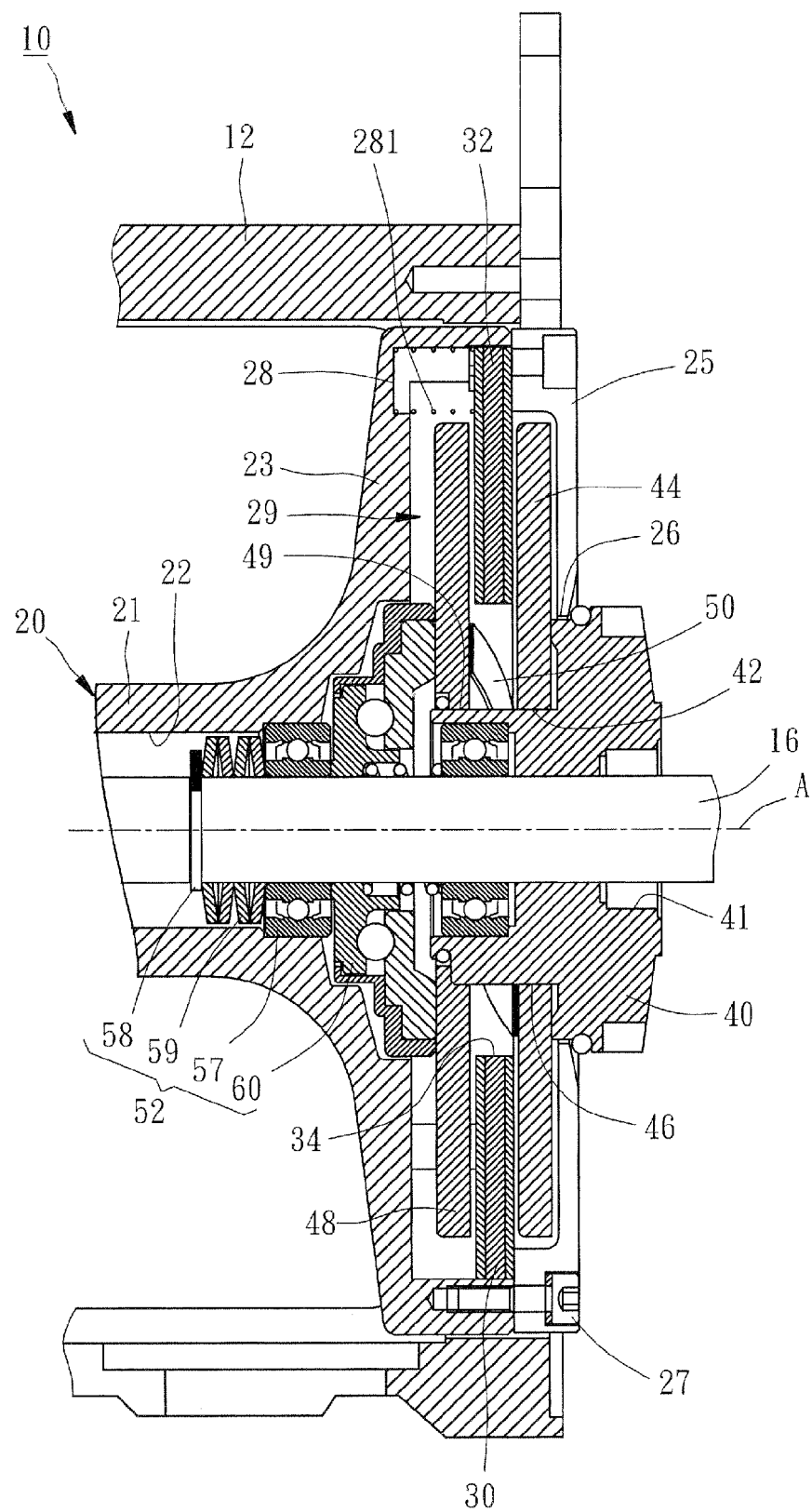
FIG. 4 is an enlarged view of a part of FIG. 3.
Figure 5:
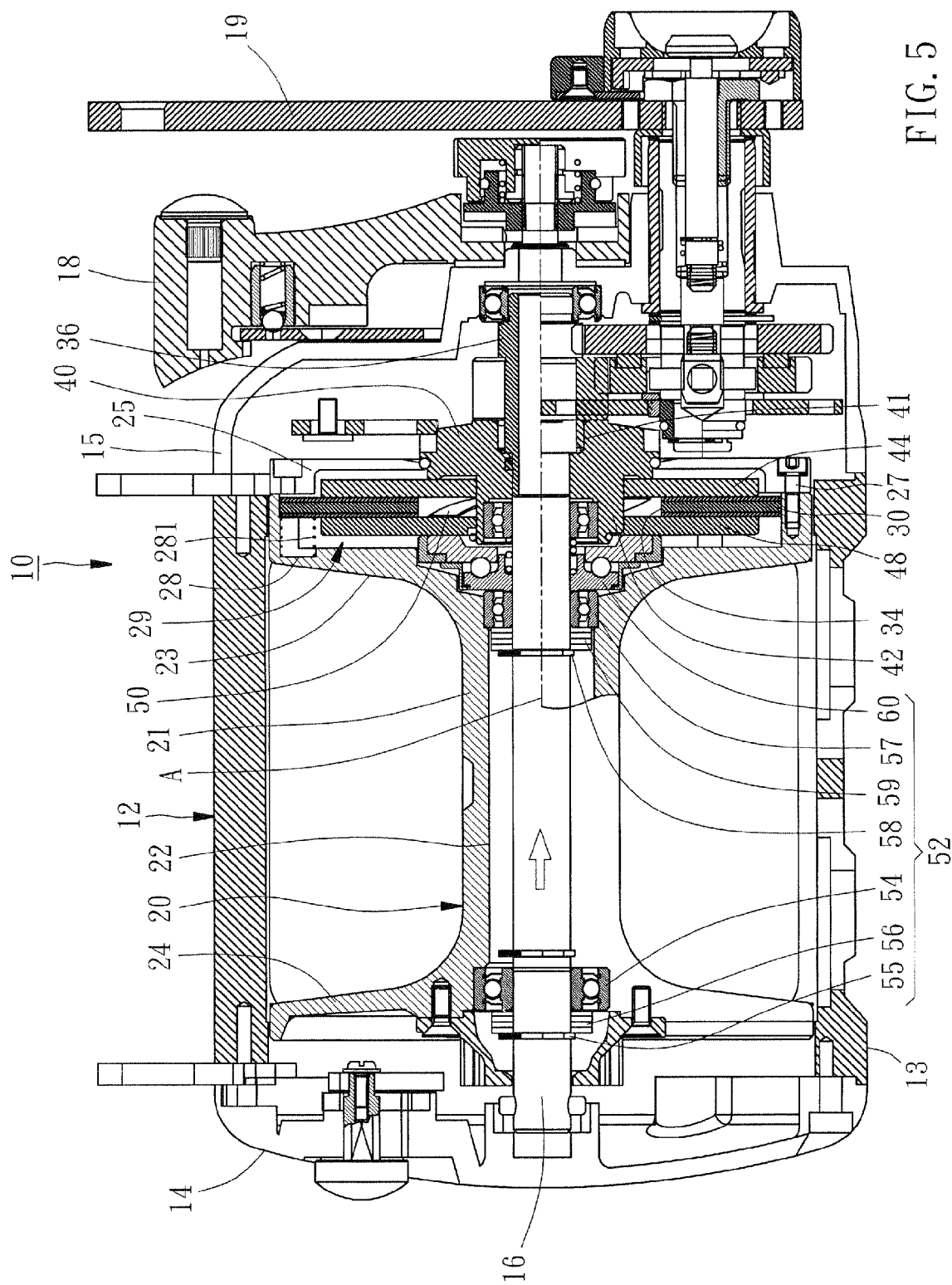
FIG. 5 is similar to FIG. 3 but showing the fishing reel operated.
Figure 6:
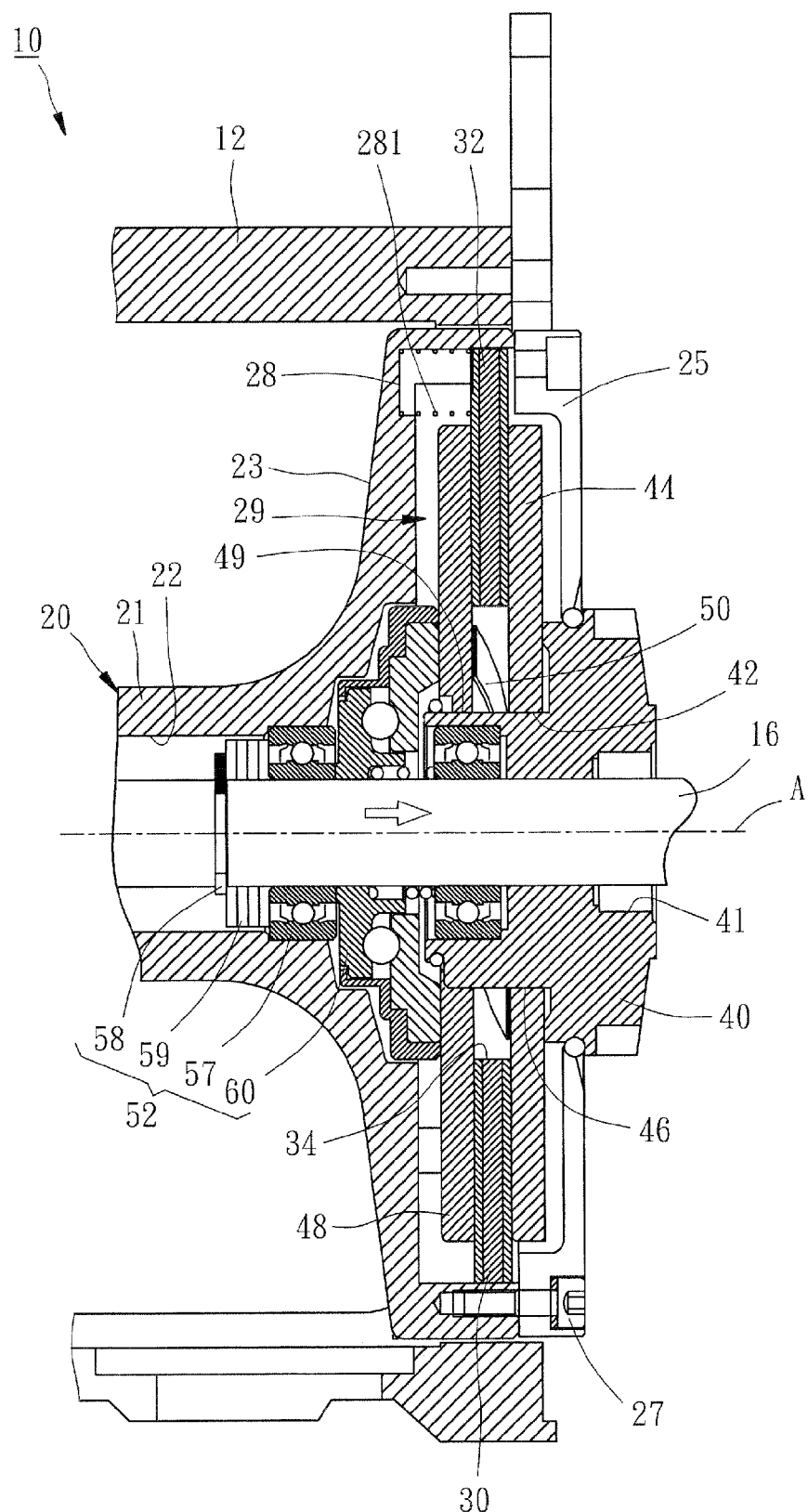
FIG. 6 is an enlarged view of a part of FIG. 5.

When the shaft 16 locates at the first position, as shown in FIGS. 3 and 4, the support set 52 simply supports the spool 20. At this time, the brake pad 30 does not touch the first disk 44 or the second disk 48. The spool 20 is freely rotatable and the power of the handle 19 cannot be transmitted to the spool 20. On the contrary, when the shaft 16 is driven by the spanner 18 to move rightward to the second position, as shown in FIGS. 5 and 6, the shaft 16 forces the spool 20 to move rightward by means of the retaining ring 55, the spring washers 56 and the left bearing 54, keeping the brake pad 30 in contact with the first disk 44. At the same time, the shaft 16 forces the second disk 48 to move rightward by means of the retaining ring 58, the spring washers 59, the right bearing 57 and the thrust bearing 60, keeping the second disk 48 in close contact with the brake pad 30. Thus, the shaft 16 exerts a pressure to both of the spool 20 and the second disk 48 through the support set 52 to force the first disk 44 and the second disk 48 clamping on the two opposite sides of the brake pad 30 to provide huge braking force to the spool 20. Therefore, the invention eliminates the problem of slipping between the brake pad and the metal disk as seen in the prior art design. Further, the invention allows transmission of rotary driving power from the handle 19 through the gear rod 36, the bushing 40, the two disks 44, 48 and the brake pad 30 to the spool 20 effectively. Because the invention eliminates the slipping problem of the prior art design, the transmission loss of the transmission of the rotary driving power from the handle 19 to the spool 20 is insignificant.

Although a particular embodiment of the invention has been described in detail for purposes of illustration, various modifications and enhancements may be made without departing from the spirit and scope of the invention. For example, the number of the recesses 28 of the first flange 23 of the spool 20 as well as the number of the protruding portions 32 of the brake pad 30 may be changed, i.e., the first flange 23 of the spool 20 can be made having at least one recess 28, and the brake pad 30 can be made having at least one protruding portion 32 to fit the at least one recess 28 of the first flange 23. The number of the springs 281 between the first flange 23 of the spool 20 and the brake pad 30 may be changed, i.e., at least one spring member 281 is enough. The engagement portion 42 of the bushing 40 can be made having any non-circular cross section that fits the axial hole 46 of the first disk 44 and the axial hole 49 of the second disk 48. Coil springs may be used to substitute for the spring members 50. The support set 52 may be made in any of a variety of alternate forms capable of supporting the spool 20 and exerting a pressure to the second disk 48 or moving the spool 20 upon movement of the shaft 16. The brake pad 30 and the first disk 44 and second disk 48 may be made of different materials such as metal, carbon fiber cloth, etc. Accordingly, the invention is not to be limited except as by the appended claims.

What is claimed is:

1. A fishing reel, comprising:
   a casing;
   a shaft mounted in said casing and movable in an axial direction between a first position and a second position;
   a spool having an axle, an axial hole for receiving said shaft, a first flange radially extending from a first end of said axle, a second flange radially extending from a second end of said axle, a cover affixed to said first flange and defining with said first flange a chamber; wherein said cover has an axial hole;
   a brake pad mounted in said chamber of said spool in a manner that said brake pad is rotatable with said spool;
   a gear rod rotatably sleeved onto said shaft;
   a bushing fixedly sleeved onto one end of said gear rod and inserted into said axial hole of said cover such that said bushing rotates with said gear rod;
   a first disk mounted in said chamber between said brake pad and said cover in a manner that said first disk is rotatable with said bushing;
   a second disk mounted in said chamber between said brake pad and said first flange in a manner that said second disk is rotatable with said bushing;
   a spring member connected between said first disk and said second disk; and
   a support set provided between said shaft and said spool; wherein said shaft exerts a pressure to said second disk through said support set to force said second disk, said brake pad and said first disk abutted one another when said shaft locates at said second position.

2. The fishing reel as claimed in claim 1, wherein said brake pad is provided with at least one protruding portion and said first flange of said spool is provided with at least one recess for receiving said at least one protruding portion of said brake pad.

3. The fishing reel as claimed in claim 1, further comprising a plurality of spring supported between said first flange of said spool and said brake pad.

4. The fishing reel as claimed in claim 1, wherein said bushing comprises an engagement portion having a non-circular cross section and said first disk comprises an axial hole for receiving the engagement portion of said bushing.

5. The fishing reel as claimed in claim 1, wherein said bushing comprises an engagement portion having a non-circular cross section and said second disk comprises an axial hole for receiving the engagement portion of said bushing.

6. The fishing reel as claimed in claim 1, wherein said spring member is a spring washer.

7. The fishing reel as claimed in claim 1, wherein said support set comprises a bearing sleeved onto said shaft and positioned at said second end of said axle of said spool, a retaining ring clamped on said shaft, and at least one spring washer provided between said retaining ring and said bearing.

8. The fishing reel as claimed in claim 1, wherein said support set comprises a bearing sleeved onto said shaft and positioned at said first end of said axle of said spool, a retaining ring clamped on said shaft, at least one spring washers provided on between said retaining ring and said bearing, and a thrust bearing sleeved onto said shaft between said bearing and said second disk.

9. The fishing reel as claimed in claim 1, wherein said shaft exerts a pressure to said spool through said support set when said shaft locates at said second position.

* * * * *